US010192654B2

(12) United States Patent
Sung

(10) Patent No.: US 10,192,654 B2
(45) Date of Patent: Jan. 29, 2019

(54) FLAT CABLE AND MANUFACTURING METHOD THEREOF

(71) Applicants: Thomas Engineering Co., LTD., Cheongju-si, Chungcheongbuk-do (KR); Moon Gyu Sung, Cheongju-si, Chungcheongbuk-do (KR)

(72) Inventor: Moon Gyu Sung, Cheongju-si (KR)

(73) Assignee: Thomas Engineering Co., Ltd., Cheongju-si, Chungcheongbuk-do (KR)

( * ) Notice: Subject to any disclaimer, the term of this patent is extended or adjusted under 35 U.S.C. 154(b) by 0 days.

(21) Appl. No.: 15/539,872

(22) PCT Filed: Mar. 15, 2016

(86) PCT No.: PCT/KR2016/002553
§ 371 (c)(1),
(2) Date: Jun. 26, 2017

(87) PCT Pub. No.: WO2016/195217
PCT Pub. Date: Aug. 12, 2016

(65) Prior Publication Data

US 2018/0012679 A1 Jan. 11, 2018

(30) Foreign Application Priority Data

Jun. 2, 2015 (KR) ........................ 10-2015-0077908

(51) Int. Cl.
*H01B 7/08* (2006.01)
*F16L 3/015* (2006.01)
*H01B 13/00* (2006.01)

(52) U.S. Cl.
CPC ......... *H01B 7/0823* (2013.01); *H01B 7/0846* (2013.01); *H01B 13/0036* (2013.01)

(58) Field of Classification Search
CPC .......... H01B 7/08; H02G 1/00; H02G 3/0475; H02G 11/00; F16L 3/015
(Continued)

(56) References Cited

U.S. PATENT DOCUMENTS 2,043,044 A * 6/1936 Knoderer ............... H01B 7/202 174/102 D
3,694,563 A * 9/1972 Monds ................. H02G 3/0468 138/111
(Continued)

FOREIGN PATENT DOCUMENTS

JP 2012-005165 A 1/2012
JP 2013-219054 A 10/2013
(Continued)

*Primary Examiner* — Chau N Nguyen
(74) *Attorney, Agent, or Firm* — Rabin & Berdo, P.C.

(57) ABSTRACT

Provided are a flat cable and a manufacturing method thereof, and particularly, a flat cable including: a pod including pipe type insertion portions formed to be separated from each other by a predetermined distance at both side ends thereof and a central insertion portion of which both ends are integrally connected to the both pipe type insertion portions; a pair of left and right support members inserted into the pipe insertion portions; and multiple electric cables inserted into the central insertion portion and the central insertion portion of the pod is partitioned into multiple spaces separated from each other and multiple electric cables 30 are horizontally disposed in the separated spaces in one layer to minimize mutual entangling or friction of the electric cables.

3 Claims, 6 Drawing Sheets

(58) Field of Classification Search
USPC .......................... 174/74 R, 117 F; 248/49, 73
See application file for complete search history.

(56) References Cited

U.S. PATENT DOCUMENTS

| | | | | |
|---|---|---|---|---|
| 8,561,949 | B2 * | 10/2013 | Komiya | F16L 3/015 248/68.1 |
| 9,083,159 | B2 * | 7/2015 | Takeuchi | H02G 3/0475 |
| 2012/0205498 | A1 | 8/2012 | Komiya | |
| 2012/0298395 | A1 | 11/2012 | Gundel | |
| 2013/0075155 | A1 | 3/2013 | Kawai et al. | |
| 2013/0341063 | A1 * | 12/2013 | Gundel | H01B 11/18 174/103 |

FOREIGN PATENT DOCUMENTS

| | | | |
|---|---|---|---|
| JP | 2014-159516 | A | 9/2014 |
| JP | 2015-005498 | A | 1/2015 |
| KR | 10-1074440 | B1 | 10/2011 |
| KR | 10-2012-0093759 | A | 8/2012 |

* cited by examiner

FLAT CABLE AND MANUFACTURING METHOD THEREOF

CROSS-REFERENCE TO RELATED APPLICATIONS

This application claims priority to and the benefit of Korean Patent Application No. 10-2015-0077908 filed in the Korean Intellectual Property Office on Jun. 2, 2015, the entire contents of which are incorporated herein by reference.

TECHNICAL FIELD

The present invention relates to a flat cable and a manufacturing method thereof, and particularly, to a flat cable and a manufacturing method thereof which can minimize mutual entangling and friction of electric cables.

BACKGROUND ART

When an electric cable is connected to a moving body such as an industrial machine, an electronic device, a civil engineering machine, or the like to transmit electric signals or supply electric power, the electric cable may be entangled or twisted twist or twist with movement of the moving body.

Methods are presented, which protect the electric cable by accommodating the electric cable in a pod in order to prevent the entangling or twisting, but when the pod is entangled even though the electric cable is inserted into the pod, the electric cables included in the pod are entangled with each other to reduce a life-span of the electric cable.

In particular, since a flat cable is made in a flat band shape, the flat cable is entangled or twisted even better than a wire type cable, and as a result, the life-span of the flat cable is further shortened.

PRIOR ART DOCUMENT

Patent Document (Patent Document 1) Korean Patent Application No. 10-2010-0118027 (Registration No. 10-1074440, Invention Title: MultiJoint Cables Protecting and Guiding Device)

SUMMARY OF THE INVENTION

The present invention has been made in an effort to provide a flat cable and a manufacturing method thereof which can extend a life-span of an electric cable by minimizing mutual entangling or friction of electric cables by partitioning and separating a space into which the electric cable is inserted into a plurality of parts.

An exemplary embodiment of the present invention provides a a flat cable according to the present invention, including: a pod including pipe type insertion portions formed to be separated from each other at both side ends thereof and a central insertion portion of which both ends are integrally connected to the both pipe type insertion portions; a pair of left and right support members inserted into the pipe insertion portions; and multiple electric cables inserted into the central insertion portion and the central insertion portion of the pod is partitioned into multiple spaces separated from each other and multiple electric cables 30 are horizontally disposed in the separated spaces in one layer.

Herein, the flat cable is configured to further include a clamp including an upper clamp installed above the support member and having upper insertion grooves formed at both side ends thereof and a lower clamp installed below the support member and having lower insertion grooves formed at both side ends thereof, and the support members are inserted into the upper and lower insertion grooves and the upper clamp, and the support member and the lower clamp are screw-joined by a bolt consecutively penetrating the upper clamp 41, and the support member and the lower clamp.

In addition, an inner surface of the central insertion portion and an outer surface of the electric cable are attached to each other by an adhesive.

Meanwhile, a manufacturing method of a flat cable according to the present invention includes: an adhesive applying step of applying the adhesive to inner surfaces of an upper outer skin and a lower outer skin or an outer surface of the electric cable; a pod forming step including an insertion portion forming step in which both side ends of the upper and lower outer skins positioned at upper and lower sides of multiple electric cables horizontally disposed in one layer, respectively are consecutively pressed from a front side to a rear side to attach the upper and lower outer skins of the pressed parts and the upper and lower outer skins on the sides of the electric cables positioned at both edges among multiple electric cables are consecutively pressed from the front side to the rear side to attach the upper and lower outer skins of the pressed parts, and as a result, a central insertion portion into which the electric cable is inserted and a pipe type insertion portion independent from the central insertion portion are formed, a space separating step in which the upper and lower outer skins corresponding to the central insertion portion are consecutively pressed from the front side to the rear side to attach the upper and lower outer skins of the pressed parts, and as a result, multiple spaces which are separated from each other are formed at the central insertion portion, and a line forming step in which the upper and lower outer skins are pressed to form a press line having a predetermined depth between the electric cables; a support member inserting step of inserting the support member into the pipe type inserting portion; and a clamp installing step of connecting a clamp to the support member.

In the flat cable and the manufacturing method thereof according to the present invention, which is configured as above, it is advantageous in that since multiple separated spaces are formed at a central insertion portion and the electric cables are inserted into the separated spaces, mutual entangling of the electric cables or friction of the electric cables can be minimized.

Further, it is advantageous in that the electric cables are partitioned by forming a pressing line at the central insertion portion to prevent the electric cables from being entangled when the electric cables are twisted to some extent.

In addition, support members hold the electric cables at both sides of the central insertion portion into which the electric cable is inserted to further enhance stability of the electric cable inserted into the central insertion portion.

DETAILED DESCRIPTION

Hereinafter, an exemplary embodiment of a flat cable according to the present invention will be described in detail with reference to FIGS. 1 to 5 which are accompanied.

Figure 1:
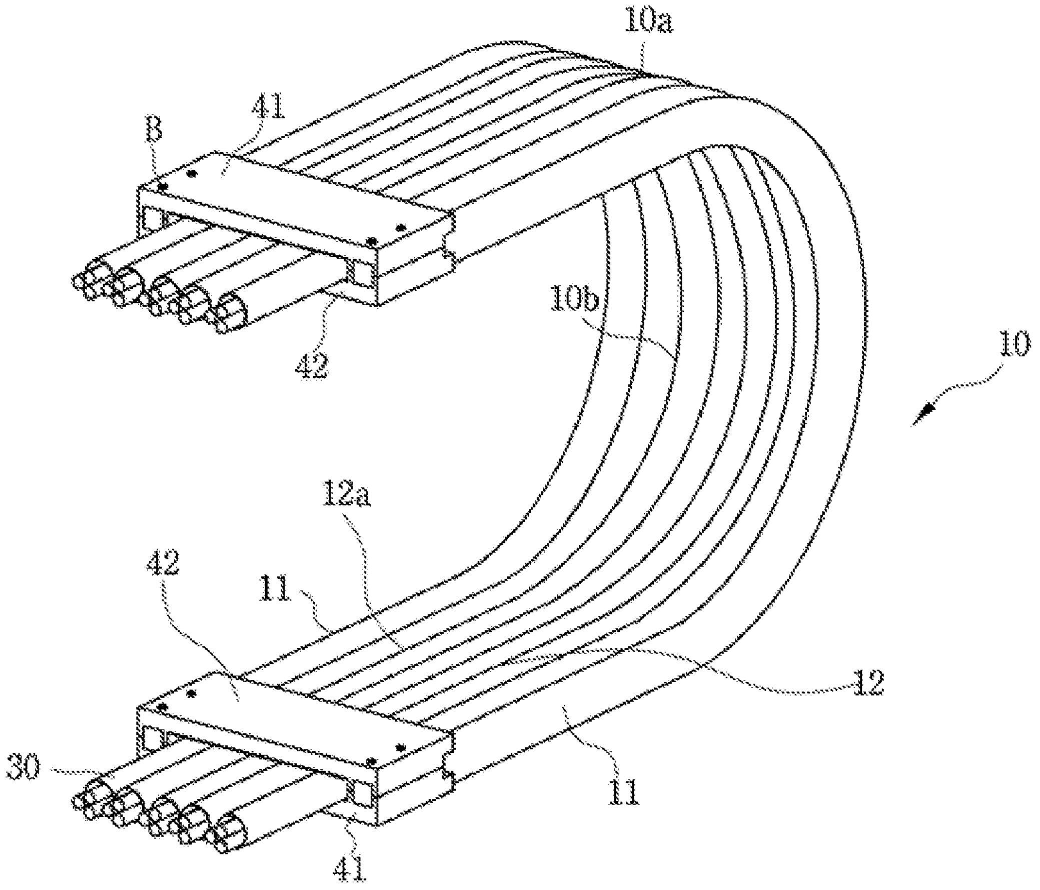
FIG. 1 is a perspective view illustrating a flat cable according to the present invention.
Figure 2:
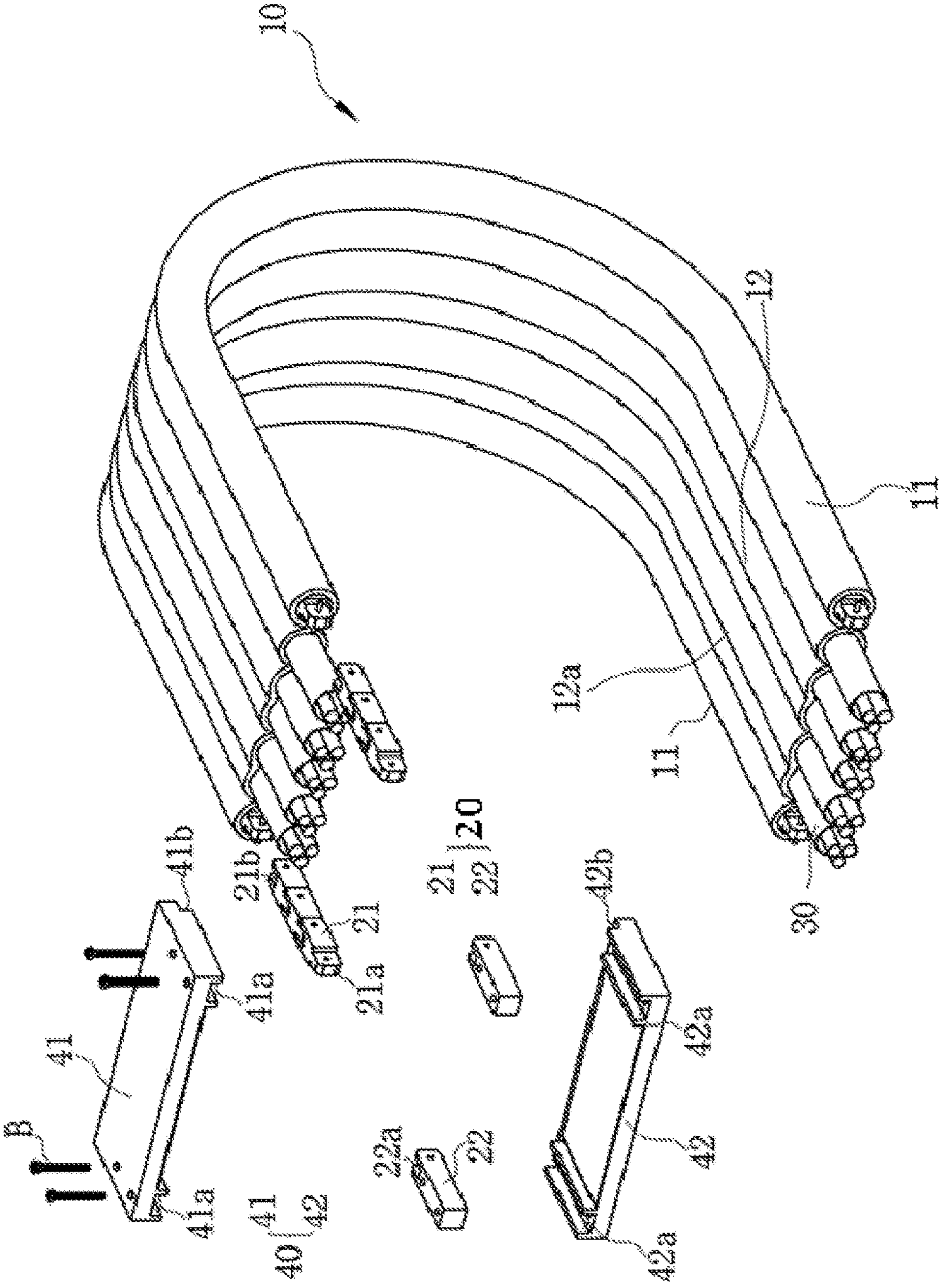
FIG. 2 is an exploded perspective view of the flat cable according to the present invention.
Figure 3:
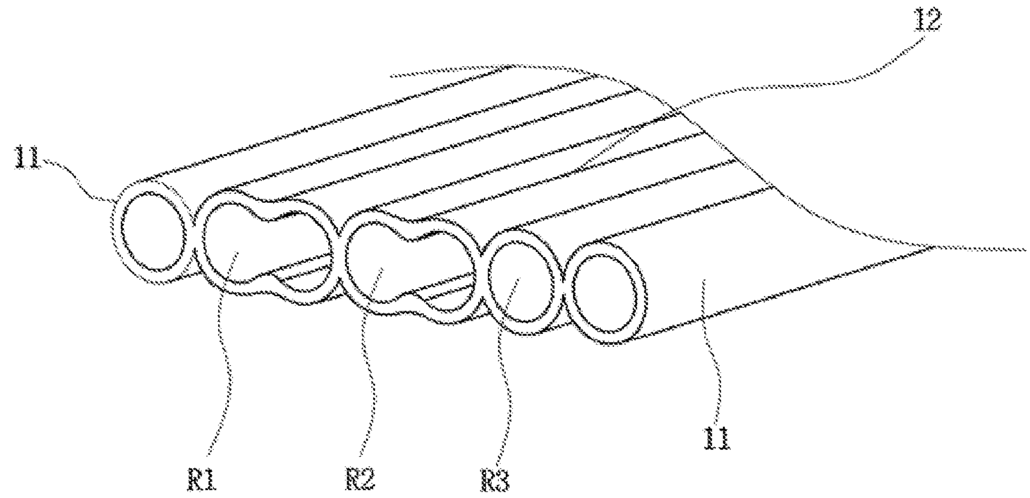
FIG. 3 is a diagram illustrating a pod of the flat cable according to the present invention.

FIG. 1 is a perspective view illustrating a flat cable according to the present invention, FIG. 2 is an exploded perspective view of the flat cable according to the present invention, and FIG. 3 is a diagram illustrating a pod of the flat cable according to the present invention.

Figure 4:
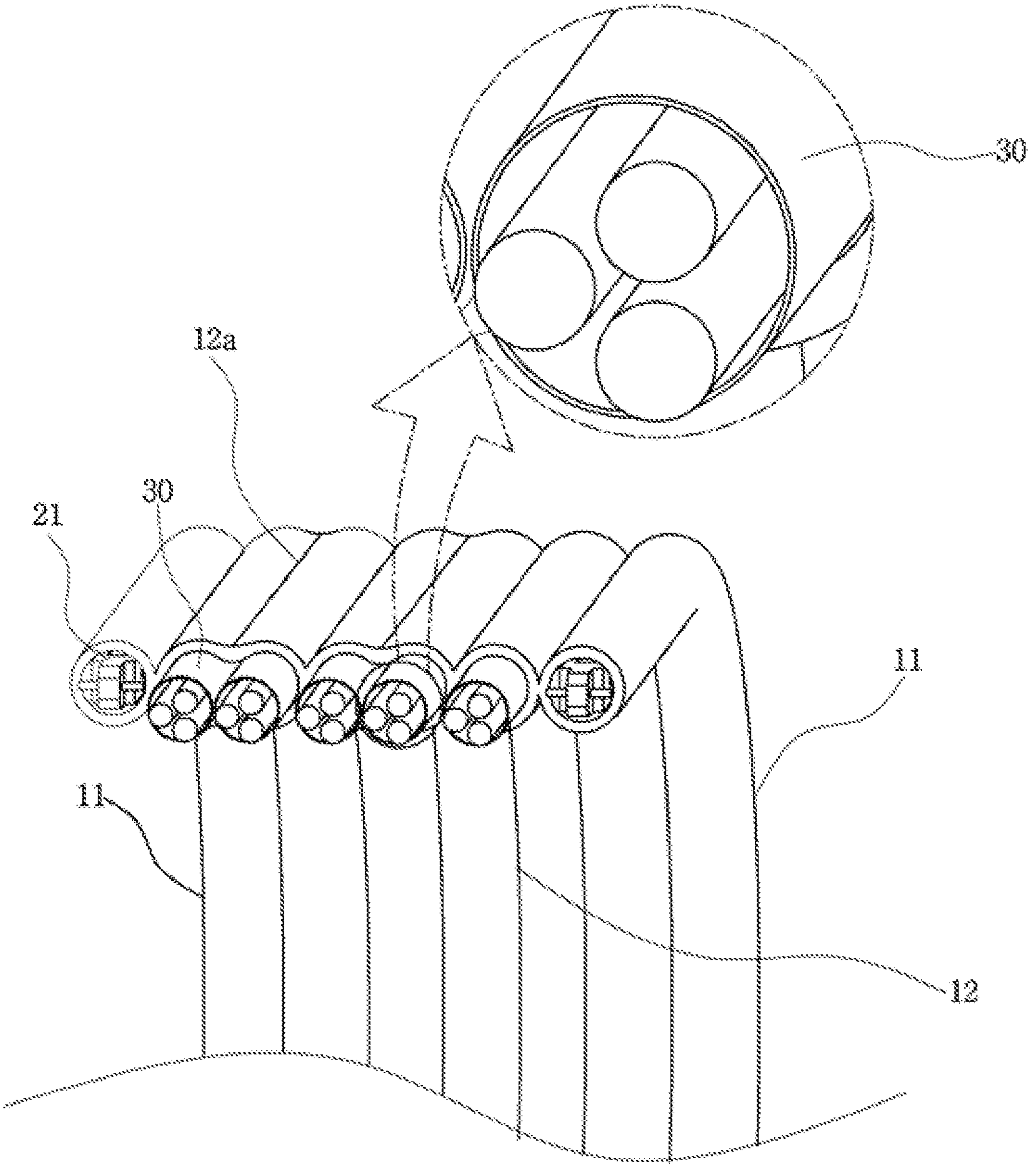
FIGS. 4 and 5 are diagrams illustrating a cross section of the flat cable according to the present invention.
Figure 5:
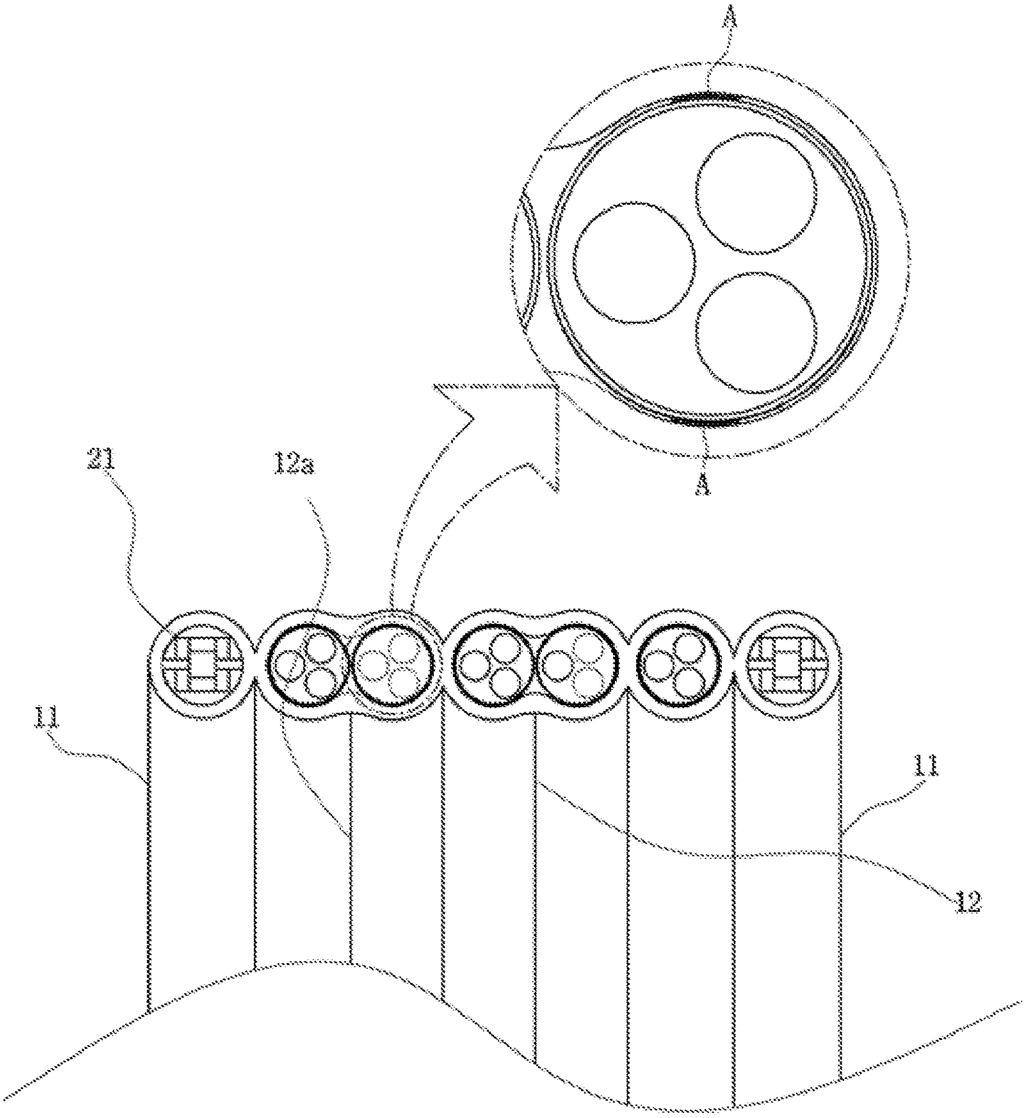

In addition, FIGS. 4 and 5 are diagrams illustrating a cross section of the flat cable according to the present invention.

The flat cable according to the present invention includes a pod 10, a pair of left and right support members 20 inserted into the pod 10, multiple electric cables 30 inserted into the pod 10, and a clamp 40 fixed to the support member 20.

The pod 10 which is formed by partitioning multiple spaces after bonding an upper outer skin 10*a* and a lower outer skin 10*b* includes a pair of pipe type insertion portions 11 and a central insertion portion 12 integrally formed at the pipe type insertion portion 11.

The pipe type insertion portions 11 are formed at both lateral ends to be separated from each other and since the pipe type insertion portion 11 has a similar shape to a general pipe, the pipe type insertion portion 11 has an elongated empty space therein. The pipe type insertion portions 11 are formed at both lateral ends to be separated from each other.

Both ends of the central insertion portion 12 are integrally connected to the pipe type insertion portion 11. That is, the central insertion portion 12 which connects the pipe type insertion portions 11 disposed at both lateral ends has the elongated empty space in a horizontal direction therein, and as a result, multiple electric cables 30 are horizontally disposed in the horizontal direction.

Herein, more specifically, the central insertion portion 12 is partitioned into multiple spaces R1, R2, and R3 of which inner parts are separated from each other. One electric cable 30 or multiple electric cables are disposed horizontally as one layer in the multiple spaces R1, R2, and R3 which are partitioned as above. That is, at the central insertion portion 12, several parts of the upper outer skin 10*a* and the lower outer skin 10*b* are bonded to each other by thermal fusion to form the separated space and the electric cable 30 is inserted into the separated space and in this case, the electric cables 30 are not stacked in multiple layers but disposed only in one layer to become a cable having a small thickness.

In addition, a pressing line 12*a* having a predetermined depth, which presses a space between the electric cables 30 is formed at the central insertion portion 12.

The pressing line 12*a* presses the upper outer skin 10*a* and the lower outer skin 10*b* toward the electric cable 30 to be formed with the predetermined depth and the electric cables 30 are disposed at both sides of the pressing line 12*a*. The upper outer skin 10*a* and the lower outer skin 10*b* do not contact each other by the pressing line 12*a*, but a distance between the upper outer skin 10*a* and the lower outer skin 10*b* at a portion where the pressing line 12*a* is formed is shorter than those at other portions.

When the cable is installed in a moving body such as an industrial machine or a civil engineering machine including a robot, twisting external force is applied to the cable and in this case, when there is no pressing line 12*a*, an array of the electric cables 30 disposed in one layer at the central insertion portion 12*a* is twisted, and as a result, the electric cables 30 are entangled with each other. When the electric cables 30 are entangled with each other as such, phenomena of shortening the life-span of the electric cable 30, which include a risk of a short circuit occur, and as a result, the entanglement of the electric cables 30 needs to be minimized. Therefore, when the pressing line 12*a* is formed as described in the present invention, the electric cable 30 may resist a predetermined degree of external force even though the resistance is not perfect, thereby preventing the arrangement of the electric cables 30 which are horizontally arranged in one layer from being rumpled.

Further, as described above, in the present invention, since the separated (independent) spaces R1, R2, and R3 are formed at the central insertion portion 12 and the electric cables 30 are inserted into the separated spaces R1, R2, and R3, the electric cables 30 may be more effectively prevented from being entangled with each other.

Meanwhile, an inner surface of the central insertion portion 12 and an outer surface of the electric cable 30 may be attached to each other by an adhesive A. That is, when the adhesive A is applied onto the inner surface of the central insertion portion 12 or the adhesive A is applied to the outer surface of the electric cable 30, the central insertion portion 12 and the electric cable 30 are in strong close contact with each other, thereby fundamentally preventing the electric cable 30 from moving at the central insertion portion 12.

The support member 20 is inserted into the pipe type insertion portion 11 of the pod 10. Since the support member 20 may just prevent the flat cable from being excessively stuck to a lower side, the support member 20 may be selected among a multijoint link, a hose, and a shape memory alloy and in the present invention, a structure of the multijoint link is primarily described.

The multijoint link includes multiple unit joints 21 and finishing joints 22 connected to the unit joints 21.

The unit joint 21 is inserted into the pipe type insertion portion 11 and multiple unit joints 21 are connected to each other in line and each connection point is configured to pivot at a predetermined angle, and as a result, the unit joint 21 may have a smoothly rounded shape when the external force is applied to the unit joint 21.

In more detail, the unit joint 21 has an engagement protrusion 21*a* at the center of a front end thereof and an engagement groove 21*b* at the center of a rear end thereof. Therefore, when the unit joints 21 are connected to each other in line, the engagement protrusion 21*a* of the unit joint 21 positioned at a rear side engages in the engagement groove 21*b* of the unit joint 21 positioned at a front side and thereafter, is pierced by a pin. Therefore, the respective unit joints 21 pivot each other around the pin.

The finishing joint 22 which is connected to the unit joint 21 positioned at a frontmost side among the multiple unit joints 21 is inserted into an upper insertion groove 41*a* and a lower insertion groove 42*a*.

In more detail, an engagement groove 22*a* is formed at the center of the rear end of the finishing joint 22, and as a result, the engagement protrusion 21*a* of the unit joint 21 positioned just behind the engagement groove 22*a* engages at the engagement groove 22*a*. In addition, the rear end of the finishing joint 22 and the engagement protrusion 21*a* of the unit joint 21 are pierced by the pin. As a result, the finishing joint 22 and the engagement protrusion 21*a* pivot around the pin.

Multiple electric cables 30 are inserted into the central insertion portion 12 of the pod 10. A fore-end portion of the electric cable 30 is exposed to the outside of the central insertion portion 12 to be positioned between upper and lower clamps 41 and 420.

In more detail, the electric cables 30 are inserted into the separated spaces R1, R2, and R3 of the central insertion portion 12 and the electric cables 30 are installed in line so that outer surfaces of the electric cables 30 contact each other in a lateral direction. In addition, the electric cables 30 are installed only in one layer without being stacked in a vertical direction.

The clamp 40 includes an upper clamp 41 and a lower clamp 42 positioned below the upper clamp 41.

The upper clamp 41 is installed above the support member 20, and upper insertion grooves 41*a* are formed at both side ends of the upper clamp 41 and upper suspension projections 41*b* are formed at entrance portions of the upper insertion portions 41*a*.

The upper insertion groove 41*a* is a portion into which an upper portion of the finishing joint 22 of the support member 20 is inserted.

The upper suspension projection 41*b* prevents the central insertion portion 12 from further advancing forward toward the upper insertion groove 41*a*.

The lower clamp 42 is installed below the support member 20, and lower insertion grooves 42*a* are formed at both side ends of the lower clamp 42 and lower suspension projections 42*b* are formed at the entrance portions of the lower insertion grooves 42*a*.

The lower insertion groove 42*a* is a portion into which a lower portion of the finishing joint 22 of the support member 20 is inserted.

The lower suspension projection 42*b* prevents the central insertion portion 12 of the pod 10 from further advancing forward toward the lower insertion groove 42*a*.

As described above, the support member 20 is inserted into the upper insertion groove 41*a* and the lower insertion groove 42*a* and thereafter, joined to a bolt B. Additionally, the bolt B consecutively penetrates both side ends of the upper clamps 41*a* and both side ends of the finishing joint 22 and the lower clamp 42 in the vertical direction to screw-join the upper clamp 41, and the finishing joint 22 and the lower clamp 42. As a result, the upper clamp 41, and the finishing joint 22 and the lower clamp 42 are firmly connected to each other.

Meanwhile, in the flat cable according to the present invention, which is configured as above, one pod 10 including multiple electric cables 30 horizontally disposed in one layer therein may be singly used, but multiple pods 10 may be used while being stacked in the vertical direction.

The configuration of the flat cable according to the present invention is described as above and hereinafter, a manufacturing method of the flat cable will be described with reference to FIG. 6.

Figure 6:
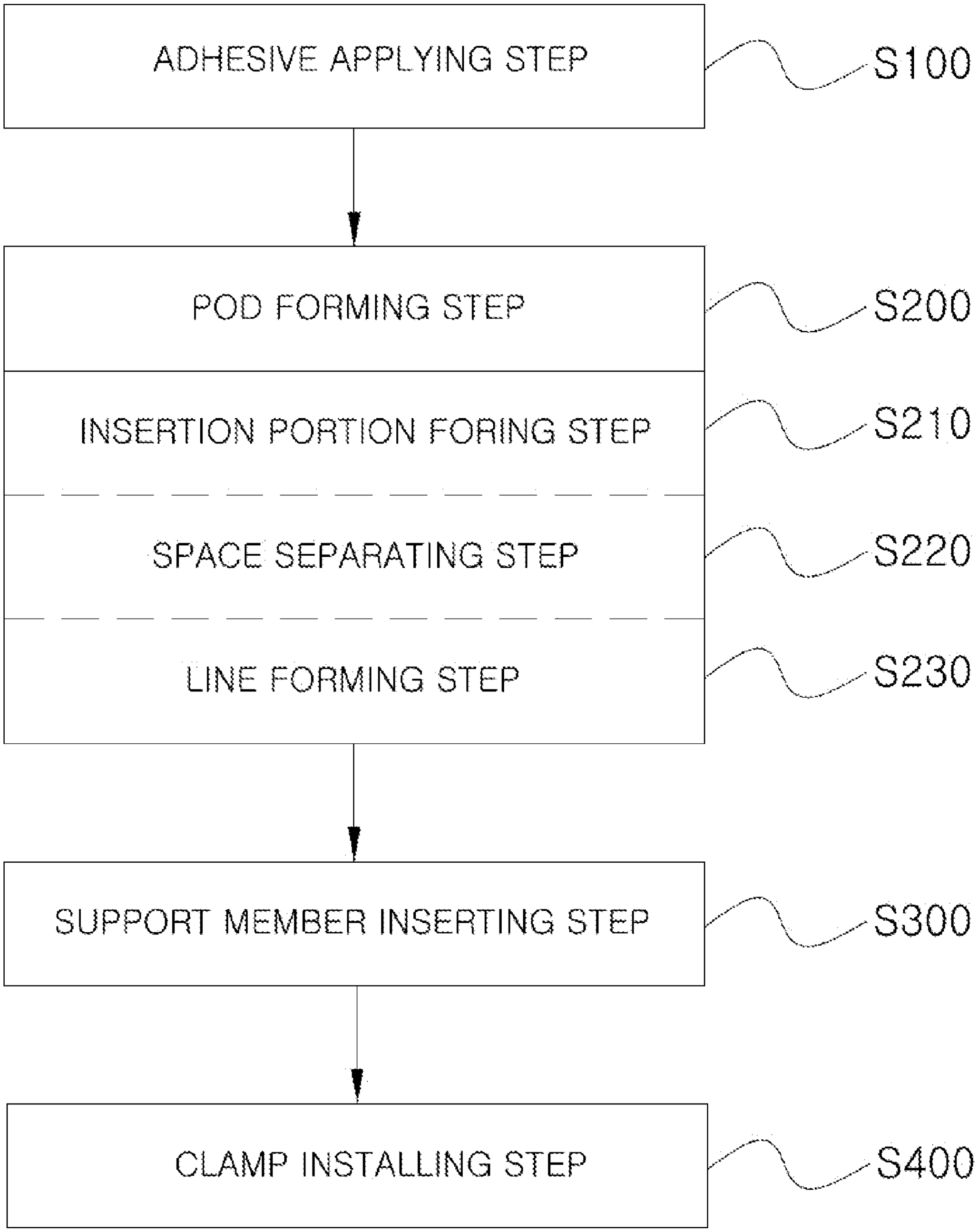
FIG. 6 is a diagram illustrating a manufacturing method of the flat cable according to the present invention.

FIG. 6 is a diagram illustrating a manufacturing method of the flat cable according to the present invention.

The manufacturing method of the flat cable according to the present invention includes an adhesive applying step (S100), a pod forming step (S200), a support member inserting step (S300), and a clamp installing step (S400).

The adhesive applying step (S100) is a process in which the adhesive A is applied to the inner surfaces of the upper outer skin 10*a* and the lower outer skin 10*b* positioned at upper and lower sides of multiple electric cables 30 horizontally disposed in one layer, respectively or the outer surface of the electric cable 30 to allow the outer surface of the electric cable 30 to be attached onto the inner surfaces of the upper and lower outer skins 10*a* and 10*b* through the pod forming step (S200). The adhesive A may be applied only to the upper outer skin 10*a* part and the lower outer skin 10*b* part corresponding to the entrance portion and an exit portion of the central insertion portion 12 and applied throughout the entirety of the central insertion portion 12.

The pod forming step (S200) includes an insertion portion forming step (S210), a space separating step (S220), and a line forming step (S230). Three processes (the insertion portion forming step, the space separating step, and the line forming step) constituting the pod forming step (S200) are performed not in a time order but simultaneously.

The insertion portion forming step (S210) is a process of forming the pipe type insertion portion 11 and the central insertion portion 12.

In more detail, the insertion portion forming step (S210) is a process in which both side ends of the upper and lower outer skins 10*a* and 10*b* positioned at the upper and lower sides of multiple electric cables 30 horizontally disposed in one layer, respectively are consecutively pressed from a front side to a rear side to attach the upper and lower outer skins 10*a* and 10*b* of the pressed parts by thermal fusion and the upper and lower outer skins 10*a* and 10*b* on upper sides of the electric cables 30 positioned at both edges among multiple electric cables 30 are consecutively pressed from the front side to the rear side to attach the upper and lower outer skins 10*a* and 10*b* of the pressed part. The central insertion portion 12 into which the electric cables 30 are inserted and the pipe type insertion portion 11 separated independently from the central insertion portion 12 are formed through such a process.

The space separating step (S220) is a process in which the upper and lower outer skins 10*a* and 10*b* corresponding to the central insertion portion 12 are consecutively pressed from the front side to the rear side to attach the upper and lower outer skins 10*a* and 10*b* of the pressed parts, and as a result, multiple spaces R1, R2, and R3 which are separated from each other are formed at the central insertion portion 12. When the space separating step (S220) is not performed, only one space is formed at the central insertion portion 12 and multiple separated spaces are formed at the central insertion portion 12 by the space separating step (S220). One or two or more electric cables 30 are inserted into multiple spaces R1, R2, and R3 which are formed as above, respectively.

The line forming step (S230) is a process in which the upper and lower outer skins 10*a* and 10*b* are pressed to form the press line 12*a* having a predetermined depth between the electric cables 30. Additionally, a process in which pressure is applied to the upper and lower outer skins 10*a* and 10*b* constituting the central insertion portion 12 formed through the insertion portion forming step (S210) toward the electric cable 30 to form the pressing line 12*a* having the predetermined depth is the line forming step 230.

The support member inserting step (S300) is a process of inserting the support member 20 into the pipe type inserting portion 11.

The clamp installing step (S400) is a process of connecting the clamp 40 to the support member 20 inserted into the pipe type inserting portion 11. That is, a process of fixing the clamp 40 to the support member 20 by laying a fore-end portion of the support member 20 between the upper and lower clamps 41 and 42 and fastening the fore-end portion with the bolt B is the clamp installing step (S400).

SEQUENCE LIST TEXT

10: Pod
10*a*: Upper outer skin

10*b*: Lower outer skin
11: Pipe type insertion portion
12: Central insertion portion
12*a*: Pressing line
20: Support member
21: Unit joint
21*a*: Engagement protrusion
21*b*: Engagement groove
22: Finishing joint
22*a*: Engagement groove
30: Electric cable
40: Clamp
41: Upper clamp
41*a*: Upper insertion groove
41*b*: Upper suspension projection
42: Lower clamp
42*a*: Lower insertion groove
42*b*: Lower suspension projection
A: Adhesive
B: Bolt
R1, R2, R3: Separated space

What is claimed is:

1. A flat cable comprising:

a pod (10) including pipe type insertion portions (11) formed to be separated from each other at both side ends thereof and a central insertion portion (12) of which both ends are integrally connected to the both pipe type insertion portions (11);

a pair of left and right support members (20) inserted into the pipe insertion portions (11);

multiple electric cables (30) inserted into the central insertion portion (12); and a clamp (40) including an upper clamp (41) installed above the support member (20) and having upper insertion grooves (41*a*) formed at both side ends thereof and a lower clamp (42) installed below the support member (20) and having lower insertion grooves (42*a*) formed at both side ends thereof, wherein the central insertion portion (12) of the pod (12) is partitioned into multiple spaces (R1, R2, and R3) separated from each other and multiple electric cables (30) are horizontally disposed in the separated spaces in one layer, and the support members (20) are inserted into the upper and lower insertion grooves (41*a* and 42*a*), an upper suspension projection (41*b*) is formed the entrance portion of the upper insertion groove (41*a*), and the lower suspension projection (42*b*) is formed at the entrance portion of the lower insertion groove (42*a*), upper clamp (41), and the support member (20) and the lower clamp (42) are screw-joined by a bolt (B) consecutively penetrating the upper clamp (41), and the support member (20) and the lower clamp (42).

2. The flat cable of claim 1, wherein a pressing line (12*a*) having a predetermined depth, which presses a space between the electric cables (30) is formed at the central insertion portion (12).

3. The flat cable of claim 1, wherein an inner surface of the central insertion portion (12) and an outer surface of the electric cable (30) are attached to each other by an adhesive (A).

* * * * *